United States Patent
Pastusek

(10) Patent No.: US 10,547,163 B2
(45) Date of Patent: Jan. 28, 2020

(54) CABLE CONNECTOR

(71) Applicant: Mike Pastusek, Fort Worth, TX (US)

(72) Inventor: Mike Pastusek, Fort Worth, TX (US)

(*) Notice: Subject to any disclaimer, the term of this patent is extended or adjusted under 35 U.S.C. 154(b) by 0 days.

(21) Appl. No.: 15/961,649

(22) Filed: Apr. 24, 2018

(65) Prior Publication Data

US 2019/0123534 A1  Apr. 25, 2019

Related U.S. Application Data

(60) Provisional application No. 62/550,414, filed on Aug. 25, 2017.

(51) Int. Cl.
*H02G 3/06* (2006.01)
*H02G 15/013* (2006.01)
*H02G 3/04* (2006.01)
*H02G 15/188* (2006.01)

(52) U.S. Cl.
CPC ......... *H02G 3/0641* (2013.01); *H02G 3/0468* (2013.01); *H02G 15/013* (2013.01); *H02G 15/188* (2013.01)

(58) Field of Classification Search
CPC ... H02G 3/0641; H02G 3/0468; H02G 15/013
USPC ........................................................ 174/654
See application file for complete search history.

(56) References Cited

U.S. PATENT DOCUMENTS

| 3,488,073 | A | * | 1/1970 | Wold ..................... F16L 11/15 174/75 R |
| 9,431,815 | B1 | | 8/2016 | Findley |
| 2018/0183192 | A1 | * | 6/2018 | Youtsey ................. H01R 24/40 |

FOREIGN PATENT DOCUMENTS

GB  1421215  *  1/1976

* cited by examiner

*Primary Examiner* — Timothy J Thompson
*Assistant Examiner* — Charles Pizzuto
(74) *Attorney, Agent, or Firm* — Jack D. Stone, Jr.; Scheef & Stone, L.L.P.

(57) ABSTRACT

A cable has a corrugated armor exterior surface, and a split bushing defines an interior surface which conforms to the corrugated exterior surface. The bushing is split radially in one place to form a gap which may be opened to allow the bushing to open, or the bushing is split radially at two or more places to form two or more parts, and is fitted about the corrugated exterior surface. The bushing defines first and second external chamfer surfaces. A connector includes a body having external threads and a chamfer which urges against the first bushing chamfer. A nut has internal threads which engage the external threads of the body, and a chamfer which urges against the second bushing chamfer. As the nut is tightened onto the body, wedge action on the first and second bushing chamfers compresses the bushing around the corrugated exterior surface to secure the connector to the cable.

6 Claims, 7 Drawing Sheets

CABLE CONNECTOR

CROSS-REFERENCE TO RELATED APPLICATIONS

This application claims the benefit of U.S. Provisional Application No. 62/550,414, filed Aug. 25, 2017, which application is hereby incorporated herein by reference, in its entirety.

TECHNICAL FIELD

The invention relates generally to connectors for high-powered electrical cable.

SUMMARY

According to the present invention, a cable has an armor shield defining a corrugated exterior surface, and a split bushing defines an interior surface which conforms to the corrugated exterior surface. The bushing is split radially in one place to form a gap which may be opened to allow the bushing to open, and the bushing is fitted about the corrugated exterior surface. The bushing defines first and second external chamfer surfaces. A connector includes a body having external threads and a chamfer which urges against the first bushing chamfer. A nut has internal threads which engage the external threads of the body, and a chamfer which urges against the second bushing chamfer. As the nut is tightened onto the body, wedge action on the first and second bushing chamfers compresses the bushing around the corrugated exterior surface to secure the connector to the cable.

In an alternate embodiment of the invention, the bushing is split radially at two or more places to form two or more parts, and is fitted about the corrugated exterior surface.

In further embodiments of the invention, the corrugated exterior surface may be concentric or helical.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
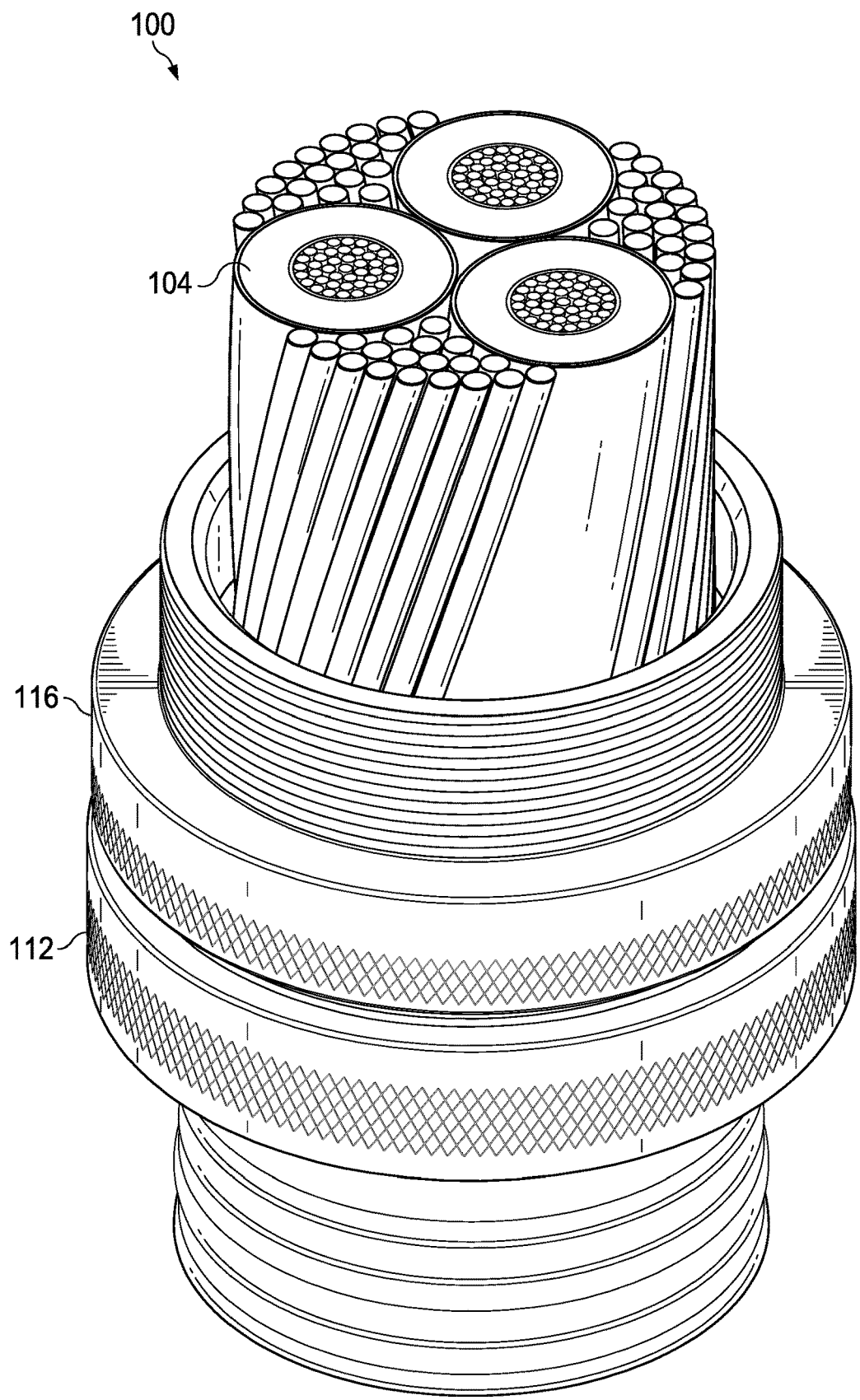
FIG. 1 is a perspective view of a cable connector embodying features of the invention.
Figure 2:
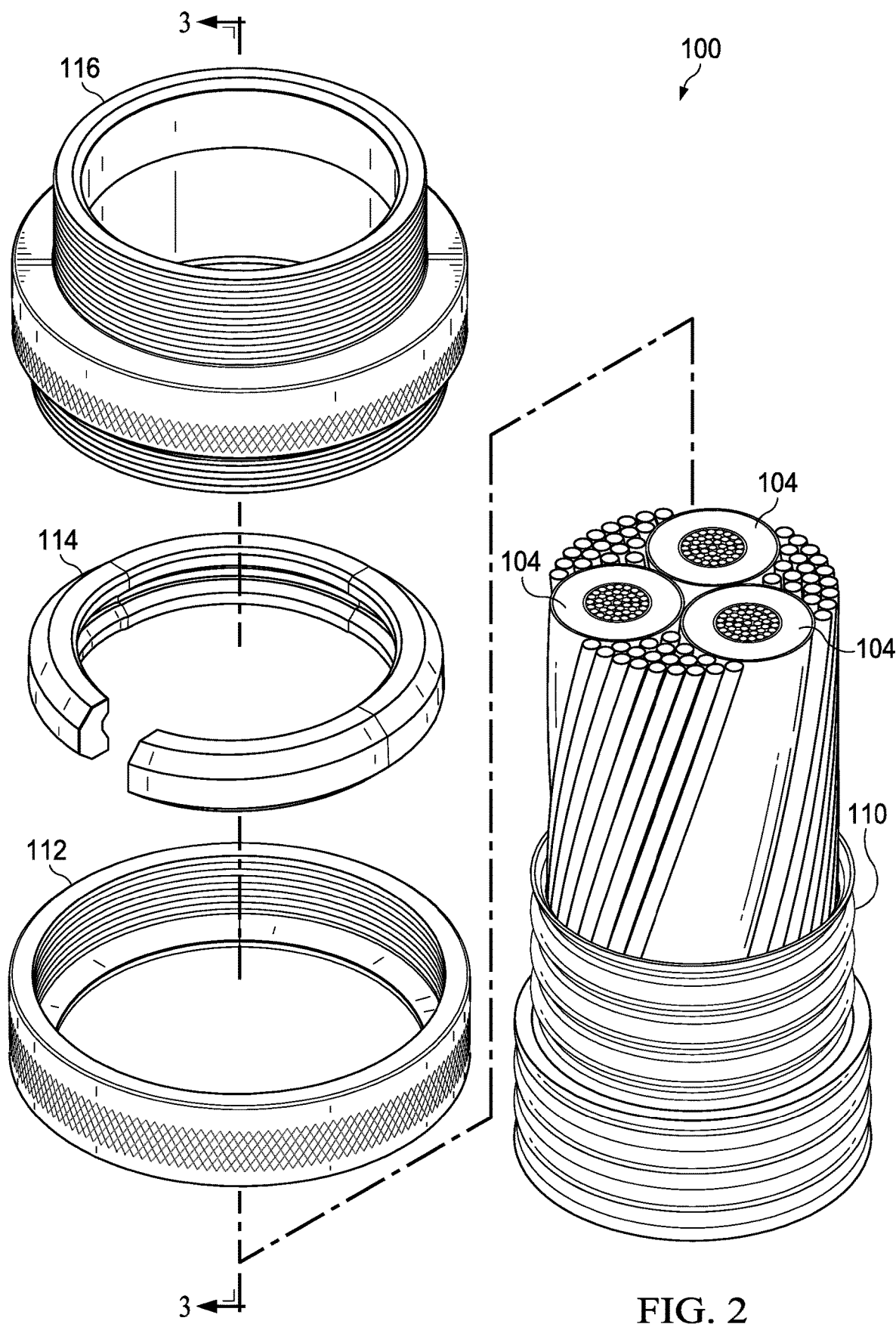
FIG. 2 is an exploded view of the cable connector of FIG. 1.
Figure 3:
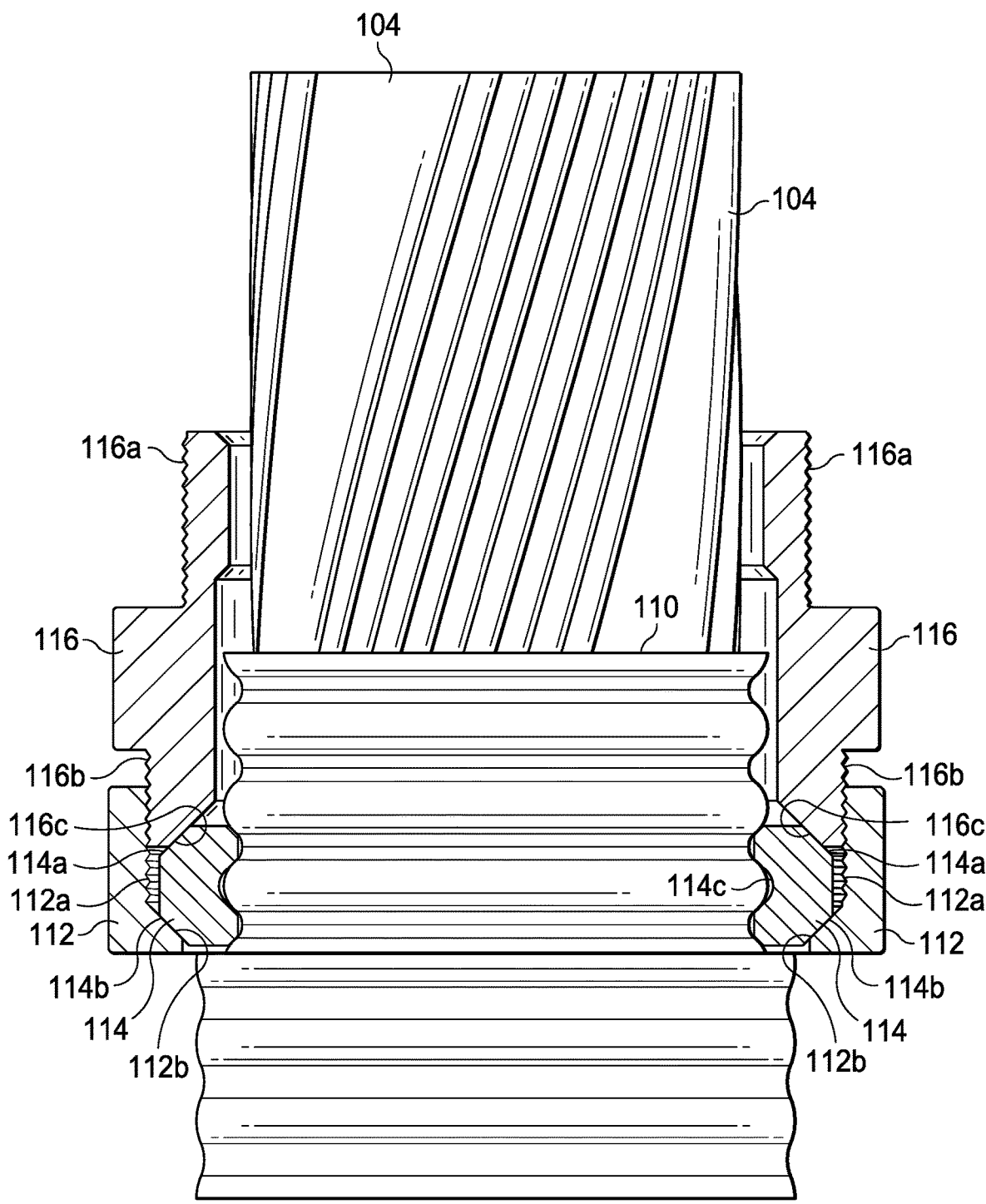
FIG. 3 is a cross sectional view of the cable connector of FIG. 1 taken along the ling 3-3 of FIG. 2.
Figure 4:
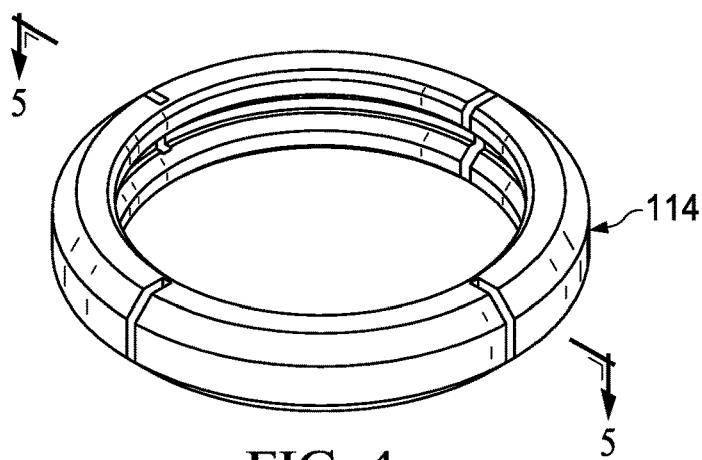
FIG. 4 is perspective view of the split bushing of the cable connector of FIGS. 1-3.
Figure 5:
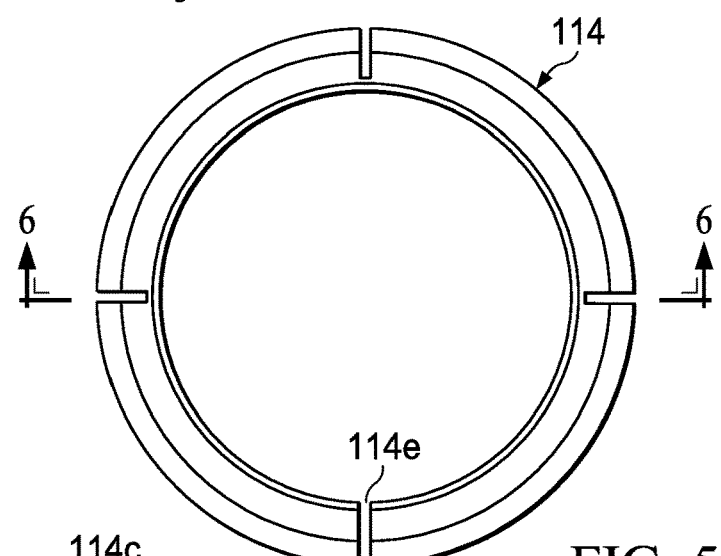
FIG. 5 is a plan view of the split bushing of FIG. 4 viewed per line 5-5 of FIG. 4.
Figure 6:
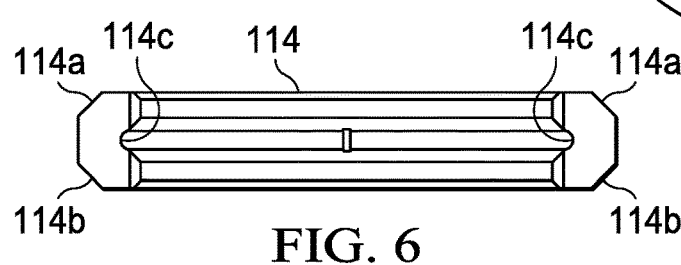
FIG. 6 is a cross sectional view of the split bushing of FIGS. 4-5 taken along the line 6-6 of FIG. 5.
Figure 7:
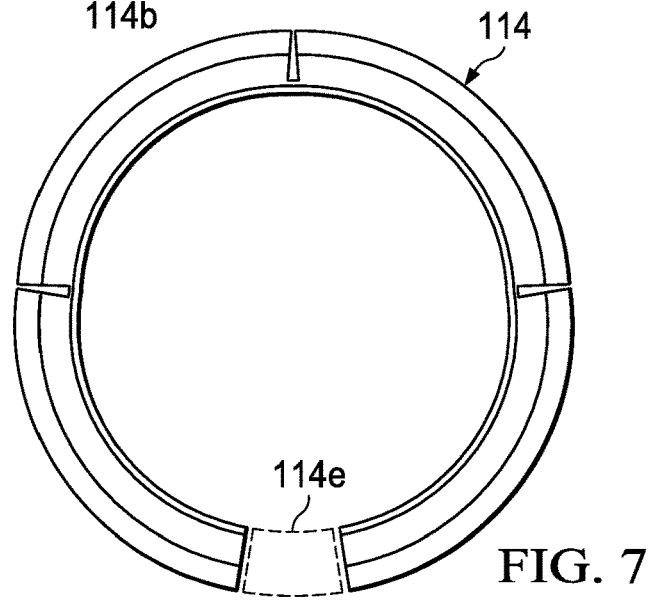
FIG. 7 depicts how the split bushing may be opened.
Figure 8:
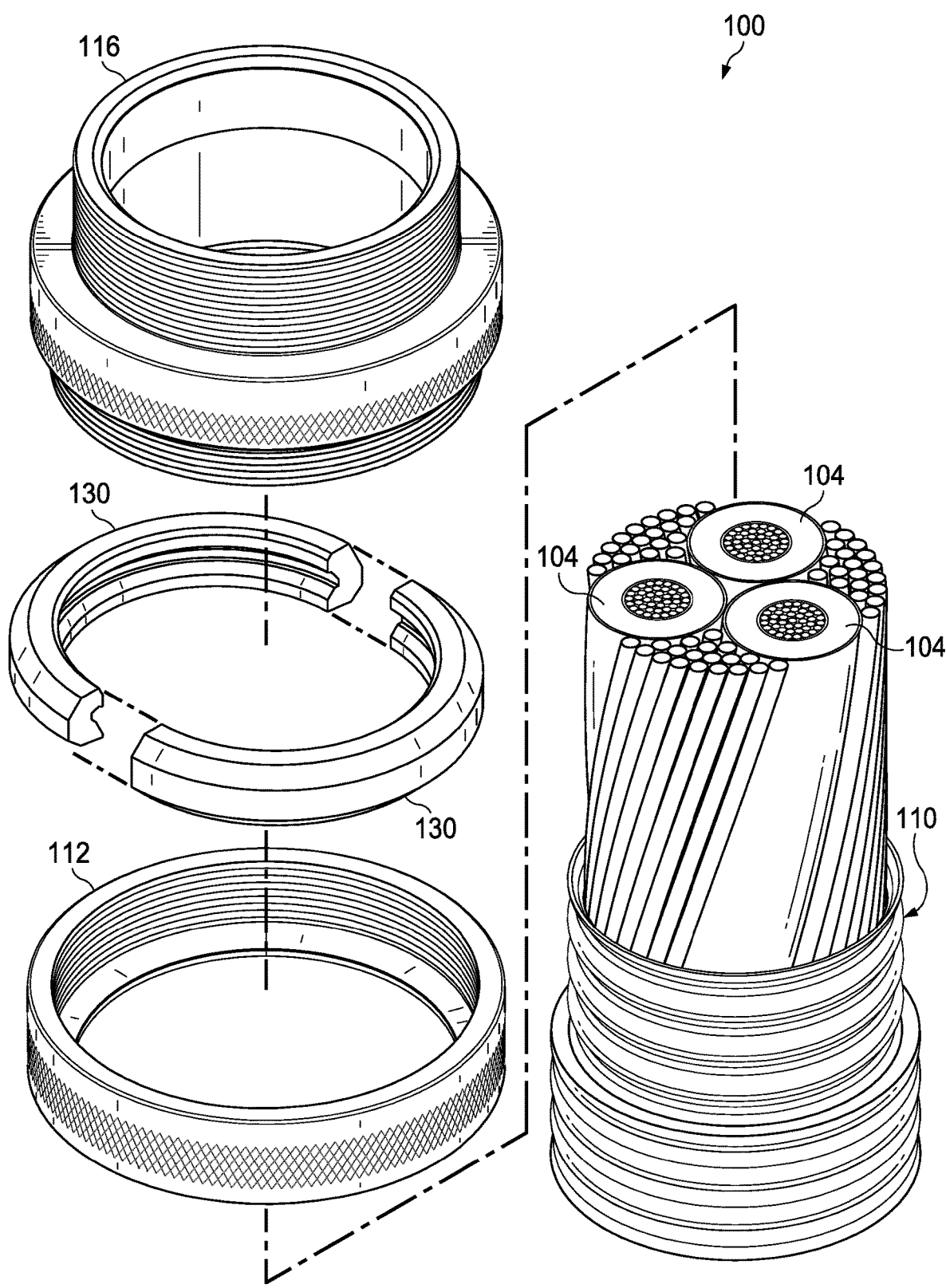
FIG. 8 is an exploded view of the cable connector using a two-part split bushing.
Figure 9:
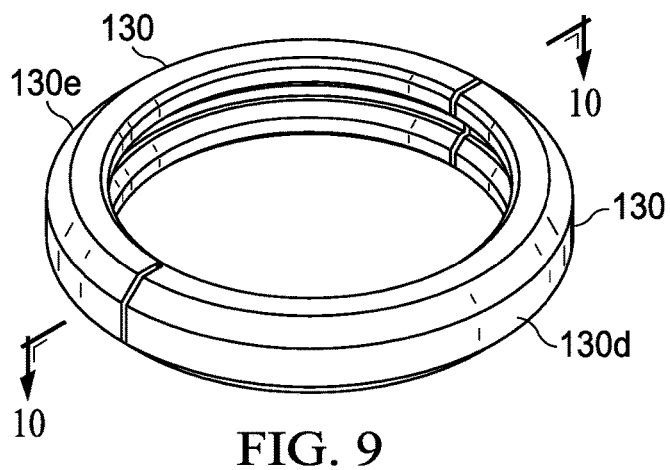
FIG. 9 is a perspective view of a two-part split bushing.
Figure 13:
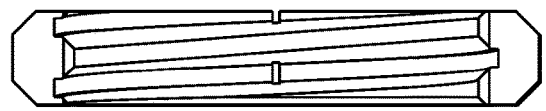
FIG. 13 is a cross-sectional view of a split bushing configured for fitting around the helical armor of FIG. 12.
Figure 10:
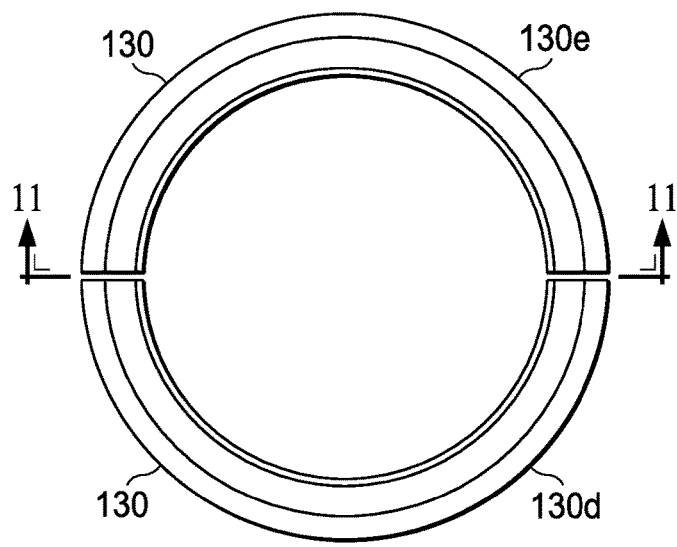
FIG. 10 is a plan view of the split bushing of FIG. 9 a viewed per line 10-10 of FIG. 9.
Figure 14:
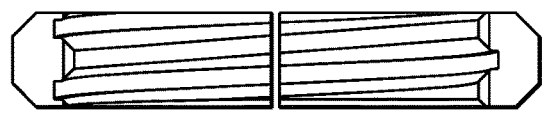
FIG. 14 is an alternate embodiment of the split bushing of FIG. 13.
Figure 11:
FIG. 11 is a cross-sectional view of the split bushing of FIGS. 9-10 taken along the line 11-11 of FIG. 10.
Figure 12:
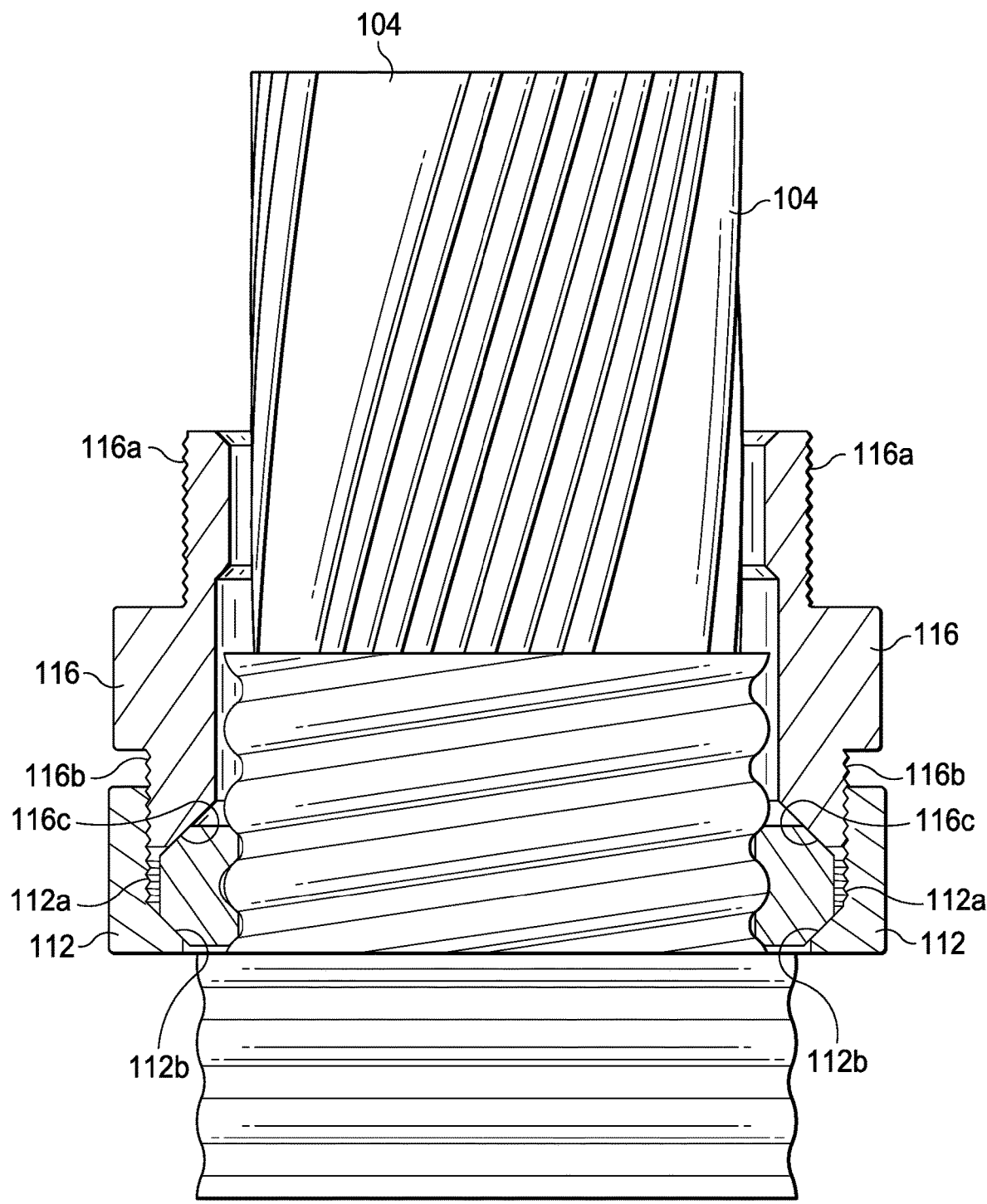
FIG. 12 is cross-sectional view of an alternate embodiment of the invention having a helical armor.

In the discussion of the FIGURES, the same reference numerals will be used throughout to refer to the same or similar components. In the interest of conciseness, various other components known to the art, such as cable configuration, and the like necessary for transmitting electrical current, have not been shown or discussed. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein. Additionally, as used herein, the term "substantially" is to be construed as a term of approximation.

Referring to FIG. 1 of the drawings, the reference numeral 100 generally designates a cable connector embodying features of the present invention. The cable connector 100 for a cable 104 includes an armor shield 110 (which may be concentric or helical) defining a corrugated exterior surface. In one embodiment, a split bushing 130 is split into two or more bushing portions 130*d* and 130*e*, wherein the bushing 130 defines first and second external circumferential chamfers 130*a* and 130*b*, and an internal surface 130*c* configured to conform to the shape of the corrugated exterior surface 110.

A body 116 has at one end, first external threads 116*a*, and at an opposing end, second external threads 116*b*, and an internal chamfer 116*c* configured to urge against the first chamfer 130*a* of the split bushing 130.

A nut 112 has internal threads 112*a* for engaging the second external threads 116*b* of the body 116, wherein the nut 112 defines an internal chamfer 112*b* configured to urge against the second chamfer 130*b* of the bushing 130 when the bushing is positioned on the corrugated exterior surface 110. When the internal threads 112*a* of the nut 112 engage the second external threads 116*b* of the body 116 and the nut 112 is tightened onto the body 116, the bushing 130 is compressed against the corrugated exterior surface 110 of the cable 104 and the connector 100 is secured to the cable 104.

In an alternative embodiment, a cable 104 having a corrugated exterior surface 110 defines a corrugated exterior surface (which may be concentric or helical). A split bushing 114 is split in one place to define a gap 114*e* in the bushing, wherein the gap is expandable to allow the bushing to open and fit around the armor 110. The bushing defines first and second external circumferential chamfers 114a and 114b, and an internal surface 114c configured to conform to the shape of the corrugated exterior surface 110.

A body has a first end and a second end, wherein the first end has first external threads, and the second end has second external threads, and an internal chamfer configured to urge against the first chamfer of the split bushing when the bushing is positioned on the corrugated exterior surface.

A nut has internal threads for engaging the second external threads of the body. The nut defines an internal chamfer configured to urge against the second chamfer of the bushing when the bushing is positioned on the corrugated exterior surface, wherein when the internal threads of the nut engage the external threads of the body and the nut is tightened onto the body, the bushing is compressed against the corrugated exterior surface of the cable and the connector is secured to the cable.

It is understood that the present invention may take many forms and embodiments. Accordingly, several variations may be made in the foregoing without departing from the spirit or the scope of the invention. For example, the cable could be grounded through the metal armor.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered obvious and desirable by those skilled in the art based upon a review of the foregoing description of preferred embodiments. Accordingly, it is appropriate that the appended claims be construed broadly and in a manner consistent with the scope of the invention.

The invention claimed is:

1. A cable connector comprising:
   a cable having an armor shield defining a corrugated exterior surface;
   a split bushing split into two or more bushing portions, the bushing defining first and second external circumferential chamfers and an internal surface configured to conform to a shape of the corrugated exterior surface;
   a body having at one end, first external threads, and at an opposing end, second external threads and an internal chamfer configured to urge against the first chamfer of the split bushing; and
   a nut having internal threads for engaging the second external threads of the body, the nut defining an internal chamfer configured to urge against the second chamfer of the bushing when the bushing is positioned on the corrugated exterior surface, wherein when the internal threads of the nut engage the second external threads of the body and the nut is tightened onto the body, the bushing is compressed against the corrugated exterior surface of the cable and the connector is secured to the cable.

2. The cable connector of claim 1, wherein the corrugated exterior surface is concentric.

3. The cable connector of claim 1, wherein the corrugated exterior surface is helical.

4. A cable connector comprising:
   a cable having an armor shield defining a corrugated exterior surface;
   a split bushing split in one place to define a gap in the bushing, wherein the gap is expandable to allow the bushing to open, the bushing defining first and second external circumferential chamfers and an internal surface configured to conform to a shape of the corrugated exterior surface;
   a body having a first end and a second end, the first end having first external threads, the second end having second external threads and an internal chamfer configured to urge against the first chamfer of the split bushing when the bushing is positioned on the corrugated exterior surface; and
   a nut having internal threads for engaging the second external threads of the body, the nut defining an internal chamfer configured to urge against the second chamfer of the bushing when the bushing is positioned on the corrugated exterior surface, wherein when the internal threads of the nut engage the external threads of the body and the nut is tightened onto the body, the bushing is compressed against the corrugated exterior surface of the cable and the connector is secured to the cable.

5. The cable connector of claim 4, wherein the corrugated exterior surface is concentric.

6. The cable connector of claim 4, wherein the corrugated exterior surface is helical.

* * * * *